United States Patent
Mason, Jr. et al.

(10) Patent No.: US 6,862,659 B1
(45) Date of Patent: Mar. 1, 2005

(54) UTILIZING DISK CACHE AS PART OF DISTRIBUTED CACHE

(75) Inventors: Robert S. Mason, Jr., Uxbridge, MA (US); Eitan Bachmat, Lehavim (IL); Daniel P. Leprohon, Oxford, MA (US)

(73) Assignee: EMC Corporation, Hopkinton, MA (US)

( * ) Notice: Subject to any disclaimer, the term of this patent is extended or adjusted under 35 U.S.C. 154(b) by 102 days.

(21) Appl. No.: 09/754,860

(22) Filed: Jan. 4, 2001

(51) Int. Cl.[7] ............................................. G06F 12/00
(52) U.S. Cl. ..................... 711/113; 711/170; 711/173; 711/174; 711/4
(58) Field of Search ........................ 711/113, 170, 711/173, 147, 4

(56) References Cited

U.S. PATENT DOCUMENTS

| | | | |
|---|---|---|---|
| 5,206,939 A | | 4/1993 | Yanai et al. |
| 5,778,394 A | | 7/1998 | Galtzur et al. |
| 5,809,530 A | * | 9/1998 | Samra et al. ............... 711/140 |
| 5,845,147 A | | 12/1998 | Vishlitzky et al. |
| 5,857,208 A | | 1/1999 | Ofek |
| 5,917,723 A | * | 6/1999 | Binford ..................... 364/131 |
| 6,014,756 A | * | 1/2000 | Dottling ..................... 714/15 |
| 6,381,674 B2 | * | 4/2002 | DeKoning et al. .......... 711/113 |
| 6,408,370 B2 | * | 6/2002 | Yamamoto et al. ......... 711/167 |

* cited by examiner

Primary Examiner—Kimberly McLean-Mayo
(74) Attorney, Agent, or Firm—Choate, Hall & Stewart

(57) ABSTRACT

A data storage device is described that includes a plurality of host interface units, a plurality of disk interface units, and a plurality of disk drive units each coupled to one of the disk interface units. The host interface units may be coupled to one or more external host systems for performing a data operation to a disk drive system. A disk drive unit includes a controller with an onboard memory subdivided into two sections in which one of the sections may be used in connection with performing caching operations of data. The data cached may be from the disk platter associated with the disk drive unit, or, the data cached in the section may also be from another disk drive unit different from the one associated with the disk drive unit in which the section is included. Commands are generated for performing data caching operations to the section of the onboard memory. Also described is a method of interpreting commands provided to the disk drive unit in connection with performing data caching and other data operations to the associated disk drive.

18 Claims, 3 Drawing Sheets

UTILIZING DISK CACHE AS PART OF DISTRIBUTED CACHE

BACKGROUND OF THE INVENTION

1. Technical Field

This application relates to computer storage devices, and more particularly to cache used in connection with computer storage devices.

2. Description of Related Art

Host processor systems may store and retrieve data using a storage device containing a plurality of host interface units, disk drives, and disk interface units. Such storage devices are provided, for example, by EMC Corporation of Hopkinton, Mass. and disclosed in U.S. Pat. No. 5,206,939 to Yanai et al., U.S. Pat. No. 5,778,394 to Galtzur et al., U.S. Pat. No. 5,845,147 to Vishlitzky et al., and U.S. Pat. No. 5,857,208 to Ofek. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may nor correspond to the actual disk drives. Allowing multiple host systems to access the single storage device unit allows the host systems to share data stored therein.

Performance of a storage system may be improved by using a cache. In the case of a disk drive system, the cache may be implemented using a block of semiconductor memory that has a lower data access time than the disk drive. Data that is accessed is advantageously moved from the disk drives to the cache so that the second and subsequent accesses to the data may be made to the cache rather than to the disk drives. Data that has not been accessed recently may be removed from the cache to make room for new data. Often such cache accesses are transparent to the host system requesting the data.

In many instances, increasing the amount of cache memory increases system performance. However, due to the expense of extra main memory, there is a point of diminishing returns where the cost of additional main memory for cache exceeds the value of the benefit. On the other hand, if additional memory for cache could be obtained at little or no cost, then it may be beneficial to add more cache memory.

SUMMARY OF THE INVENTION

According to the present invention, a data storage system, includes a first disk drive unit, a second disk drive unit, coupled to the first disk drive unit by a bus, a main cache memory, coupled to the bus, that caches data from at least one of the first disk drive unit and the second disk drive unit, and a secondary memory, provided as part of the first disk drive unit, where the secondary memory has at least two sections, a first section used by the first disk drive unit to facilitate disk accesses and a second section used to cache data from the second disk drive unit.

According further to the present invention, a disk drive unit, includes an interface that communicates data to and from the disk drive unit, a disk platter that stores data, and a controller coupled to the interface and the disk platter, the controller providing and accepting data signals that control the disk drive unit and communicate data therewith, where the controller includes a memory having a portion that is useable as cache for data that is not stored on the disk platter.

According further to the present invention, a data storage device includes onboard volatile memory and a section of onboard volatile memory associated with the data storage device and used as a cache including data cached from at least one other data storage device. The data storage device may be a first disk drive unit and the section of onboard volatile memory may include data cached from at least a second disk drive unit. The section of onboard volatile memory may include data cached from the first disk drive unit. The data storage device may also include an interface that provides and accepts data, a disk platter that stores data, and a controller that handles communication between the interface and the disk platter, wherein the onboard volatile memory is part of the controller. The data storage device may also include a processor of the data storage device and an other section of onboard volatile memory associated with the said data storage device in which the processor uses the other section of onboard volatile memory in connection with accessing data stored on said disk platter.

According further to the present invention, a data storage system includes a first disk drive including a section of onboard memory associated with the first disk drive, a second disk drive that provides data to the first disk drive, and memory for caching data of the data storage system, the memory including the section of onboard memory associated with the first disk drive where the section includes a portion of data cached from at least the second disk drive. The section of onboard memory may include a portion of data that is not duplicated elsewhere in the data storage system. The section of onboard memory may include a portion of data that is duplicated elsewhere in the data storage system. The memory for caching may include a portion of system memory of the data storage system. The data storage system may also include a command generator that generates at least one command for performing a data operation in connection with caching data of the system memory and at least one command for performing a data operation in connection with caching data of the section of onboard memory. The data storage system may also include a first command generator that generates at least one command for performing a data operation in connection with caching data of the system memory and a second command generator different from the first command generator that generates at least one command for performing a data operation in connection with caching data of the section of onboard memory. The data storage system may also include a command generator that generates at least one command for performing a data operation in connection with data caching of the section of onboard memory. The data storage system may also include a host interface unit that includes the command generator, the host interface unit being connected to a host computer system. The data storage system may also include a disk interface unit for interfacing with the first disk drive. The command generator may execute on a dedicated computer processor. The data storage system may also include system cache memory included in a system memory associated with the data storage system, where the command generator generates commands for performing a data operation in connection with caching data to the system cache memory. The data storage system may also include a command interpreter that interprets commands in connection with a data caching operation of one at least one of the section of onboard memory and said system cache memory.

According further to present invention, caching data includes obtaining data from a first disk drive unit and storing at least a portion of the data on volatile memory that is part of a second disk drive unit different from the first disk drive unit. Caching data may also include storing a second portion of the data from the first disk drive unit in system memory associated with a data storage device that includes the first disk drive unit and the second disk drive unit. Caching data may also include issuing commands from a command generator for storing the second portion of data in the system memory and storing the first portion of data in the memory of the second disk drive unit. Caching data may also include issuing commands from a first command generator for storing the second portion of data in the system memory and issuing commands from a second command generator different from the first command generator for storing the first portion of data in the memory of the second disk drive unit. At least one of the first and the second portions may include data that is not duplicated elsewhere in the data storage device. At least one of the first and the second portions may includes data that is duplicated elsewhere in the data storage device.

According further to the present invention, a computer program product for caching data includes machine executable code for obtaining data from a first disk drive unit and machine executable code for storing data on memory of a second disk drive unit different from the first disk drive unit. The computer program product may also include machine executable code for storing a second portion of the data from the first disk drive unit in system memory associated with a data storage device that includes the first disk drive unit and the second disk drive unit. The computer program product may also include machine executable code for issuing commands from a command generator for storing the second portion of data in the system memory and storing the first portion of data in the memory of the second disk drive unit. The computer program product may also include machine executable code for issuing commands from a first command generator for storing the second portion of data in the system memory and machine executable code for issuing commands from a second command generator different from the first command generator for storing the first portion of data in the memory of the second disk drive unit. At least one of the first and said second portions may include data that is not duplicated elsewhere in the data storage device. At least one of the first and said second portions may include data that is duplicated elsewhere in the data storage device.

DETAILED DESCRIPTION OF VARIOUS EMBODIMENTS

Figure 1:
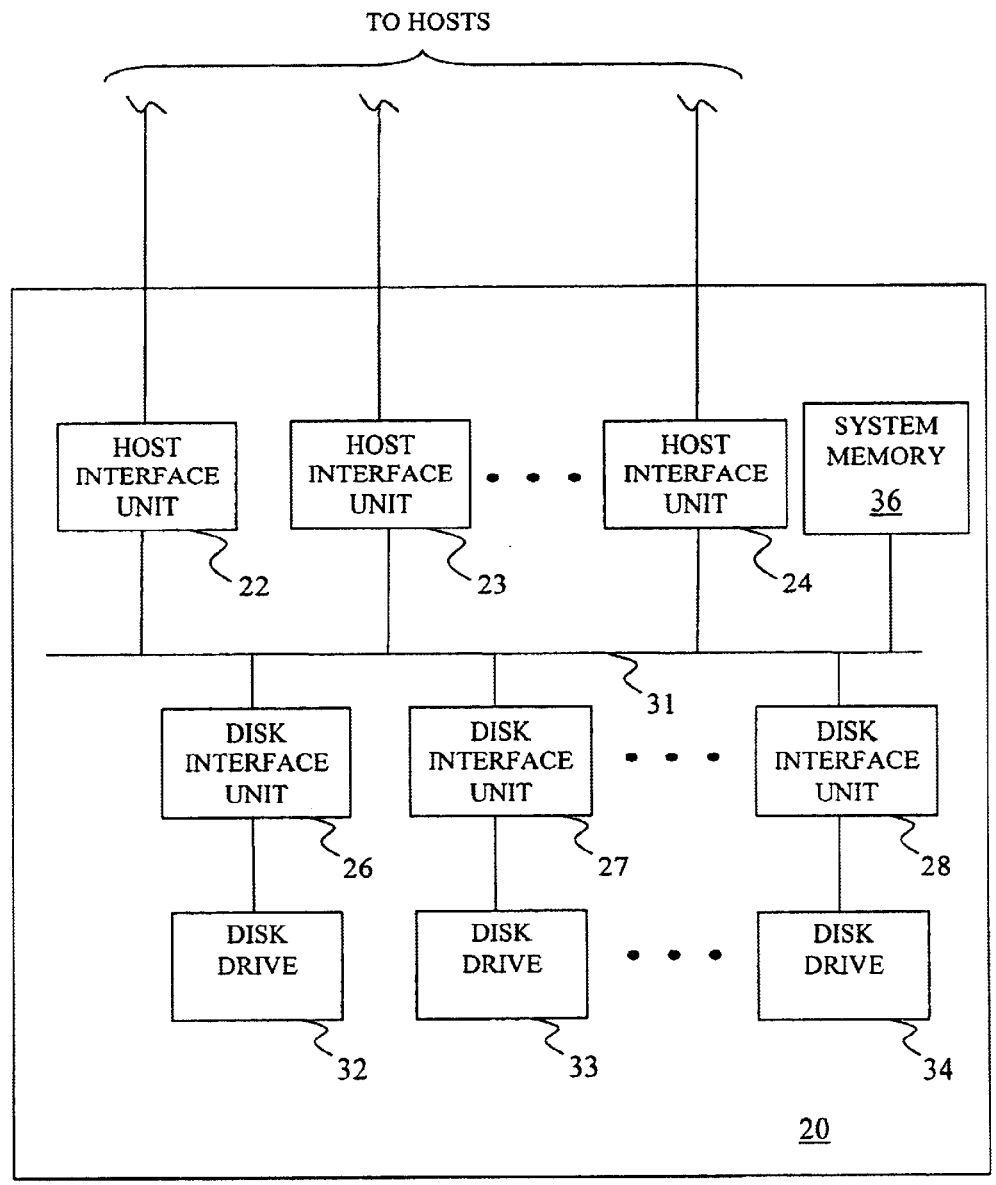
FIG. 1 is a schematic diagram that illustrates a data storage device according to the system described herein.

Referring to FIG. 1, a data storage device 20 includes a plurality of host interface units 22–24, a plurality of disk interface units 26–28, and a plurality of disk drive units 32–34, each of which is coupled to a respective one of the disk interface units 26–28. The host interface units 22–24 may be coupled to one or more external host systems (not shown), such as a computer that reads and writes data to a disk drive system.

The data storage device 20 may perform operations that would otherwise be performed by a conventional disk drive system connected to each of the host systems. Thus, the data storage device 20 receives disk commands via the host interface units 22–24 and provides disk data from the disk drive units 32–34 to the host systems through the host interface units 22–24. However, the host systems connected to the data storage device 20 do not access the disk drive units 32–34 directly, but rather, the host systems access the data storage device 20 by requesting use of one or more logical disks. The data storage device 20 translates requests from the hosts for access to particular logical disks into physical locations on the disk drive units 32–34. A bus 31 provides communication between the host interface units 22–24 and the disk interface units 26–28.

A request from a host may be provided through one of the host interface units 22–24 in the form of a logical disk number, cylinder number, and track number. That is, a host may read or write data by specifying the logical disk number, cylinder number, and track number. The request from the host passes through the respective one of the host interface units 22–24 to the appropriate one of the disk interface units 26–28 which then accesses the data on the appropriate one on the disk drive units 32–34 and provides the data to the appropriate one of host interface units 22–24.

In some instances, it may be more efficient to reduce the number of physical disk accesses made to the disk drive units 32–34 by caching some of the data that is requested. For that purpose, a system memory 36 is coupled to the bus 31 to provide storage for caching data that is transferred between the disk drive units 32–34 and the host interface units 22–24.

Figure 2:
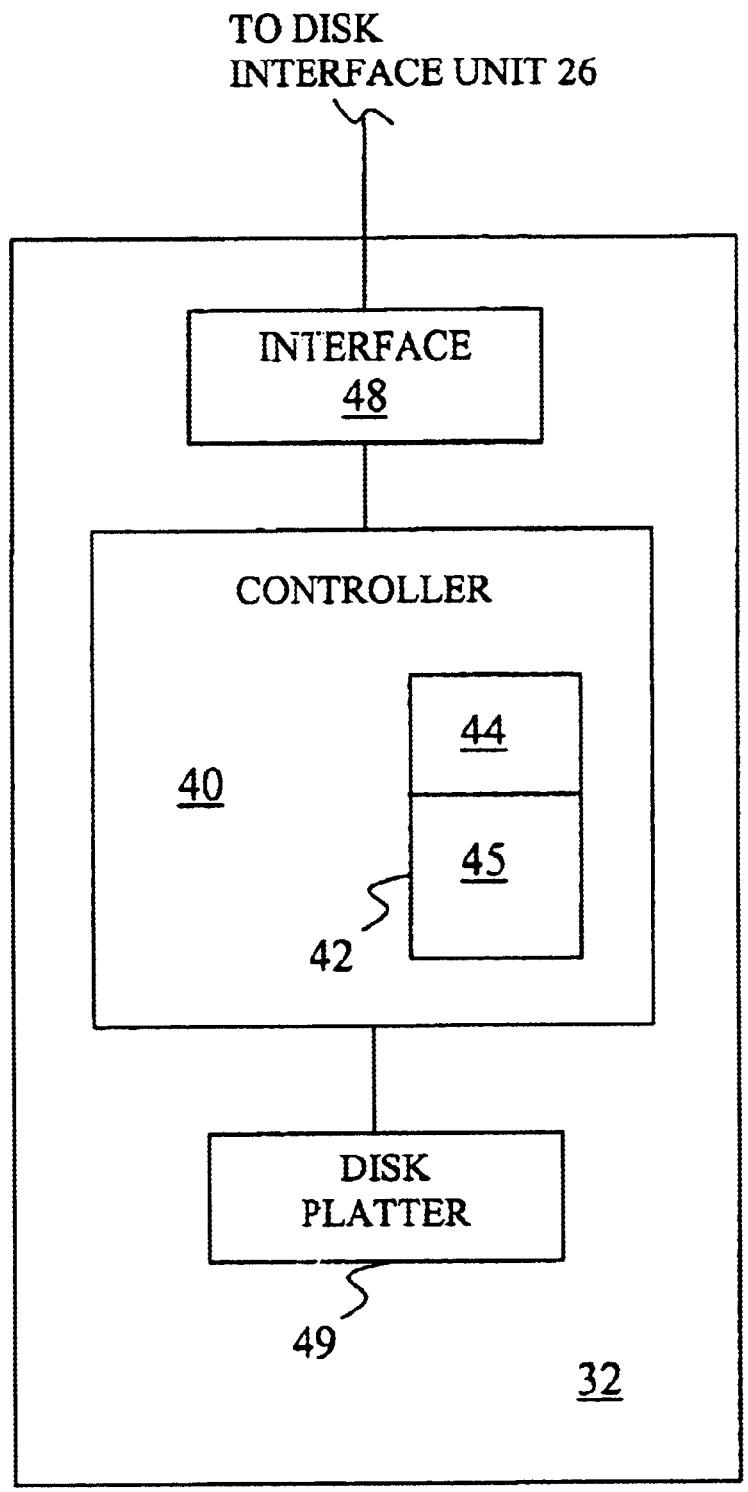
FIG. 2 is a schematic diagram of a disk interface unit according to the system described herein.

Referring to FIG. 2, the disk drive unit 32 is shown in more detail. For purposes of the discussion herein; the disk drive unit 32 may be similar or even identical to the other disk drive units 33, 34. The disk drive unit 32 includes a controller 40 that controls operation of the disk drive unit 32 in a conventional manner. The controller 40 may be implemented using a conventional disk controller having its own processor (not shown) that uses an onboard memory 42 for processor functions and/or for local caching-related to operations thereof. For the system disclosed herein, the onboard memory 42 may be subdivided into two sections: a first section 44 used by the controller 40 and a second section 45 used for external caching in a manner described in more detail hereinafter. An interface 48 provides conventional coupling between the disk interface unit 26 and the controller 40. The controller 40 is also coupled to a disk platter 49, which may be a conventional disk platter used for non-volatile disk data storage.

The second section 45 may be used by the storage device 20 for general caching. That is, for some purposes, the second section 45 may provide functionality similar to that provided by the system cache corresponding to the system memory 36 with respect to caching for the storage device 20. Commands may be provided to the disk drive unit 32 via the bus 31 and through the disk interface unit 26 to allocate, store, and retrieve data stored in the second section 45.

Generally, the cache for the storage device 20, which uses the system memory 36, includes some data that is duplicated elsewhere in the storage device 20, such as on one of the disk drive units 32–34, and, in some instances, may also include data that is present only in the cache. In an embodiment disclosed herein, the second section 45 is used only to store data that is duplicated elsewhere within the storage device 20. However, it would be possible to implement the system described herein having data stored in the second section 45 that is not duplicated elsewhere in the storage device 20.

In operation, the controller 40 and/or the interface 48 conventionally interprets commands provided to the disk drive unit 32 to read and write data from and to the disk drive 32. However, for the system described herein, the conventional command set is extended to include commands that are provided to the disk drive unit 26 via the bus to allocate portions of the memory 42 for use as part of the cache of the storage device 20 and to read and write data from and to the allocated portion. Note that the commands may be provided by one or more of the host interface units 22–24.

The data that may be stored in the second section 45 may include data that exists in other locations in the storage device 20, such as metadata for one or more of the disk drives 32–34 that are not active and structure for code (large tables) that are also stored in other locations. It is also possible to store cached data that is read from one of the disk drives 32–34 but is not modified by one of the hosts. Note that the data stored in the second section 45 does not necessarily need to be from the corresponding disk platter 49 since, as discussed herein, the second section 45 is being used by the entire storage device 20 as a supplement to the system cache provided by the system memory 36. Thus, in some embodiments, there may be no relationship between the particular source of the data stored in the second section 45 and the disk drive 32 and disk platter 49. That is, the data stored in the second section may, for example, be from the disk drive 33 and/or the disk drive 34.

Figure 3:
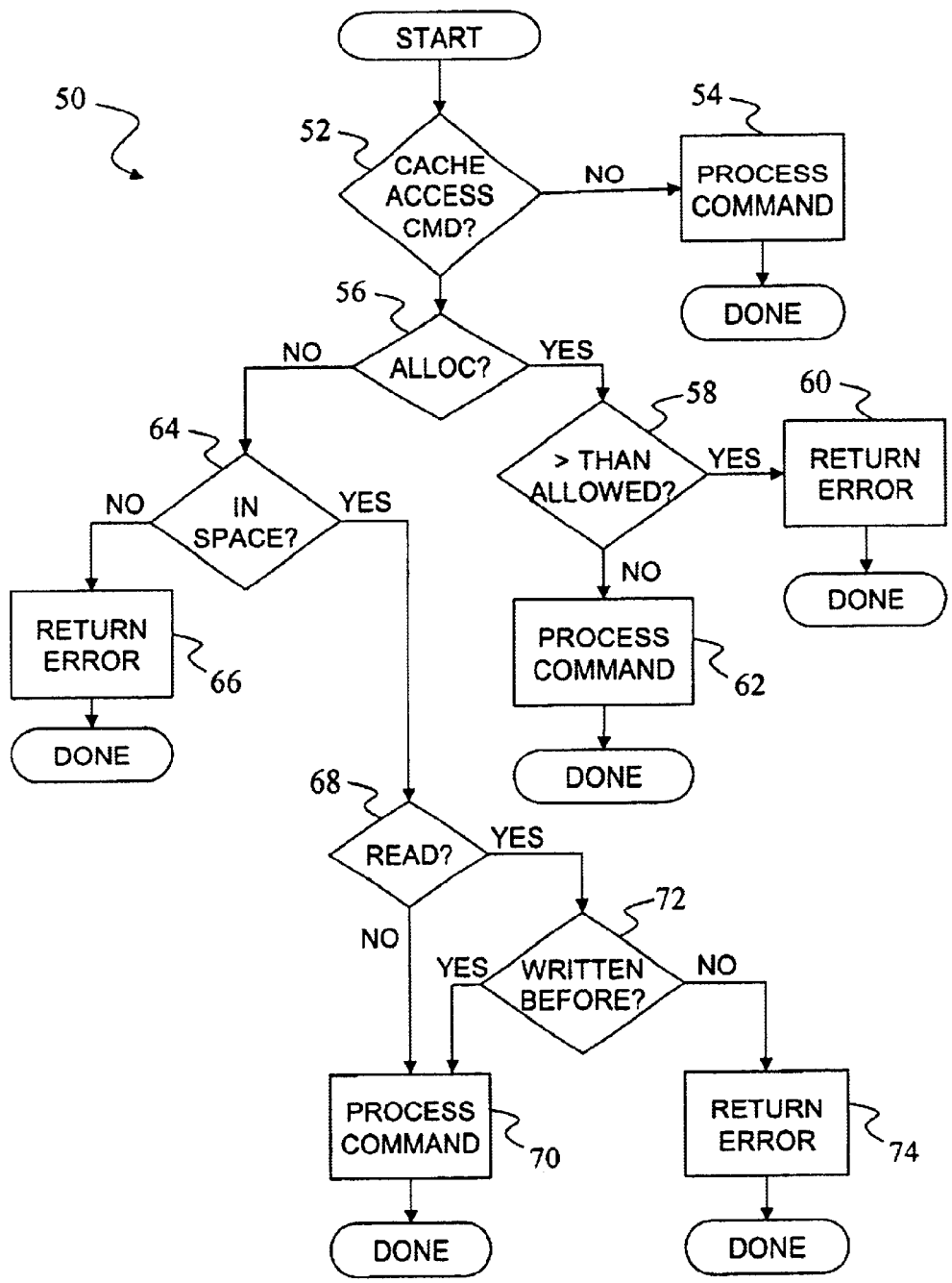
FIG. 3 is a flowchart illustrating operation of the disk interface unit according to the system described herein.

Referring to FIG. 3, a flowchart 50 illustrates steps performed by the disk drive unit 32 in connection with interpreting commands provided thereto. Processing begins at a first step 52 which determines if the command being provided is a cache access command (i.e., a command for accessing the second section 45 as part of the cache for the data storage device20). For purposes of the discussion herein, commands may be divided into two categories: commands that relate to accessing the second section 45 as part of the cache for the data storage device 20 and conventional commands that are provided to the controller 40 to access the disk drive 32 in a conventional manner.

The test performed at the step 52 determines if the command provided is a command for accessing the second section 45. If not, then the command may be a conventional disk access command provided to the controller 40 to access the disk drive 32. If it is determined at the test step 52 that the command provided is not for accessing the second section 45 of the memory 42, then control passes from the step 52 to a step 54 where the command is processed. Thus, at the step 54, the command that is processed may be a conventional command to access the disk drive 32 via the controller 40.

If it is determined at the test step 52 that the command provided is a command for accessing the second section 45 of the memory 42, then control passes from the step 52 to a test step 56 which determines if the command is an allocation command. For embodiments of the system disclosed herein, prior to using the second section 45 of the memory 42, the second section 45 is allocated to allow read and write accesses. In some embodiments, the second section 45 is allocated in four-megabyte blocks and the number of blocks is specified in the allocation command.

If it is determined at the test step 56 that the command that is provided is a command for allocation, then control passes from the test step 56 to a test step 58 which determines if the amount of memory that is allocated in the command is larger than an amount allowed. In some embodiments, the amount allowed is no more than a certain percentage than the entire amount of the memory 42, such as one-half the memory. If it is determined at the test step 58 that the requested amount of allocation is greater than the amount allowed, then control passes from the step 58 to a step 60 where an error is returned. Following the step 60, processing is complete.

If it is determined at the test step 58 that the requested amount of memory for allocation is not larger than the amount allowed, then control passes from the step 58 to a step 62 where the allocation command is processed. The allocation command may be processed in a conventional manner by setting aside the second section 45 of the memory 42 for use only by the cache mechanism disclosed herein. Following the step 62, processing is complete.

If it is determined at the test step 56 that the command is not for allocation, then control passes from the step 56 to a test step 64. Note that if control passes to the test step 64, then the command is either a read command that reads data from or a write command that writes data to the second section 45 of the memory 42. At the test step 64, it is determined if the read or write operation is in the allocated space, i.e., is accessing portions of the memory 42 that have been set aside for the second section 45 by a previous allocation command. In some embodiments, read or write operations are only allowed in portions of the memory 42 that have been allocated. If it is determined at the test step 64 that the requested read or write operation is not in the allocated space, then control passes from the step 64 to a step 66 where an error code is returned. Following step 66, processing is complete.

If it is determined at the test step 64 that the requested operation is in the allocated space, control passes from the step 64 to a test step 68 which determines if the requested operation is a read operation. If not, then control passes from the test step 68 to a step 70 where the command is processed. Note that if it is determined at the step 68 that the operation is not a read operation, then, by default, the operation is a write operation. However, in embodiments with additional commands, additional tests may be used. Since it is determined at the test step 64 that the operation is in the allocated space, then the write operation may be properly performed at the step 70 following the step 68.

If it is determined at the test step 68 that the data is a read operation, then control passes from the test step 68 to a test step 72 where it is determined if the data that is being read was previously written. In some embodiments, it is only permissible to read data after data has been written. Thus, if it is determined at the test step 72 that the read operation is attempting to read data from a portion of the second section 45 that had not been written to, then control passes from the step 72 to a step 74 where an error is returned. Following the step 74, processing is complete. Alternatively, if it is determined at the test step 72 that the data being read is from a portion of the second section 45 that had been written to before, then control passes from the test step 72 to the step 70 where the command is processed.

Note that the use of the memory 42 in the controller 40 as cache can improve system performance by improving bandwidth since accessing the memory 42 in the controller may be done independently, and in parallel, with accessing the system memory 36. This is true even if the system memory 36 is subdivided into multiple memories. Note that the cache data that is stored in the second section 45 of the memory 42 does not require destaging, since, in the embodiments disclosed herein, it is assumed that any data stored in the subsection 45 of the memory 42 also exists in other places. Thus, no destaging is necessary. However, the system described herein may be easily adapted to a system where the second section 45 holds data that is destaged.

Note that data communications of caching operations involving the second section 45 and/or the cache for the storage device 20 may be handled by any one or more of the host interface units and/or any one or more of the disk interface units. It should also be noted that an embodiment may also use one or more separate processors in connection with performing the data communications of caching operations. The one or more separate processors may perform the data communications alone or in conjunction with a host interface unit and/or a disk interface unit.

It should be noted that an embodiment may include one or more command generators for generating commands in connection with performing data caching operations with the second section 45 and/or the cache for the storage device 20. An embodiment may include a first command generator that generates commands for performing data caching operations to the second section. The embodiment may also include a second command generator different from the first command generator that generates commands for performing data caching operations to the cache for the storage device. An embodiment may also use the same command generator to generate commands for performing data caching operations to the cache for the storage device as well as the second section of onboard memory of a particular disk interface unit.

While the invention has been disclosed in connection with various embodiments, modifications thereon will be readily apparent to those skilled in the art. Accordingly, the spirit and scope of the invention is set forth in the following claims.

What is claimed is:

1. A data storage system, comprising:
   a first disk drive unit;
   a second disk drive unit, coupled to the first disk drive unit by a bus;
   a main cache memory, coupled to the bus, that caches data from both the first disk drive unit and the second disk drive unit; and
   a secondary memory separate from the main cache memory and provided as part of the first disk drive unit, wherein the secondary memory has at least two sections, a first section used by the first disk drive unit to facilitate disk accesses and a second section used to cache data provided to the second section from the second disk drive unit while said main cache memory caches data from both the first disk drive unit and the second disk drive unit, wherein data cached to the secondary memory is different from data cached to the main cache memory.

2. A data storage device comprising:
   a first section of onboard volatile memory containing data for the storage device;
   an interface for communicating data from the data storage device to a main cache memory, wherein the main cache memory contains data from at least one other data storage device and wherein the main cache memory is separate from the data storage device and the at least one other data storage device; and
   a second section of onboard volatile memory associated with the data storage device and used as a cache including data cached from the at least one other data storage device, wherein the second section of onboard volatile memory is provided with data from the at least one other data storage device and wherein data cached to the onboard volatile memory is different from data cached to the main cache memory.

3. The data storage device of claim 2, wherein the data storage device is a first disk drive unit.

4. The data storage device of claim 3, wherein said first section of onboard volatile memory includes data cached from said first disk drive unit.

5. The data storage device of claim 2, further comprising:
   an interface that provides and accepts data;
   a disk platter that stores data; and
   a controller that handles communication between said interface and said disk platter, wherein said onboard volatile memory is part of said controller.

6. The data storage device of claim 5, further comprising:
   a processor of said data storage device; and
   an other section of onboard volatile memory associated with the said data storage device in which said processor uses said other section of onboard volatile memory in connection with accessing data stored on said disk platter.

7. A data storage system comprising:
   a first disk drive including a section of onboard memory associated with the first disk drive and including an interface that handles data communication to and from the first disk drive;
   a second disk drive that provides data to the first disk drive via the interface;
   a main cache memory that caches data from both the first and second disk drives, said main cache memory being separate from the first and second disk drives and said onboard memory; and
   memory that caches data of the data storage system, said memory including said section of onboard memory associated with said first disk drive wherein said section includes a portion of data cached from at least said second disk drive, data from said second disk drive is provided to the onboard memory, and wherein data cached to the onboard memory is different from data cached to the main cache memory.

8. The data storage system of claim 7, wherein said section of onboard memory includes a portion of data that is not duplicated elsewhere in said data storage system.

9. The data storage system of claim 7, wherein said section of onboard memory includes a portion of data that is duplicated elsewhere in said data storage system.

10. The data storage system of claim 9, wherein said memory for caching includes a portion of system memory of said data storage system.

11. The data storage system of claim 10, further comprising:
    a command generator that generates at least one command for performing a data operation in connection with caching data of said system memory and at least one command for performing a data operation in connection with caching data of said section of onboard memory.

12. The data storage system of claim 10, further comprising:
    a first command generator that generates at least one command for performing a data operation in connection with caching data of said system memory; and
    a second command generator different from said first command generator that generates at least one command for performing a data operation in connection with caching data of said section of onboard memory.

13. The data storage system of claim 7, further comprising:

a command generator that generates at least one command for performing a data operation in connection with data caching of said section of onboard memory.

14. The data storage system of claim 13, further comprising:

a host interface unit that includes said command generator, said host interface unit being connected to a host computer system.

15. The data storage system of claim 13, further comprising:

a disk interface unit for interfacing with said first disk drive.

16. The data storage system of claim 13, wherein said command generator executes on a dedicated computer processor.

17. The data storage system of claim 13, further comprising:

system cache memory included in a system memory associated with said data storage system, wherein said command generator generates commands for performing a data operation in connection with caching data to said system cache memory.

18. The data storage system of claim 17, further comprising:

a command interpreter that interprets commands in connection with a data caching operation of at least one of said section of onboard memory and said system cache memory.

* * * * *